(No Model.)

A. C. GOODMAN.
SAFETY BOLT.

No. 470,238. Patented Mar. 8, 1892.

WITNESSES
Ed Is Lane
Chas. M. Stands

INVENTOR
Adam C. Goodman
By Fred W. Bond, Attorney

UNITED STATES PATENT OFFICE.

ADAM C. GOODMAN, OF CANTON, OHIO, ASSIGNOR OF ONE-HALF TO JOHN K. BOWERS, OF SAME PLACE.

SAFETY-BOLT.

SPECIFICATION forming part of Letters Patent No. 470,238, dated March 8, 1892.

Application filed November 12, 1891. Serial No. 411,649. (No model.)

*To all whom it may concern:*

Be it known that I, ADAM C. GOODMAN, a citizen of the United States, residing at Canton, in the county of Stark and State of Ohio, have invented certain new and useful Improvements in Safety-Bolts; and I do hereby declare that the following is a full, clear, and exact description of the same, reference being had to the annexed drawings, making a part of this specification, and to the letters of reference marked thereon, in which—

Figure 1:
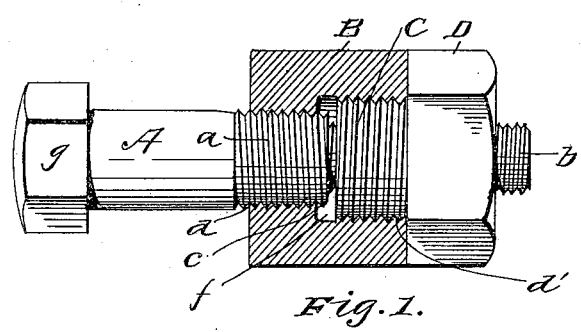
Figure 2:
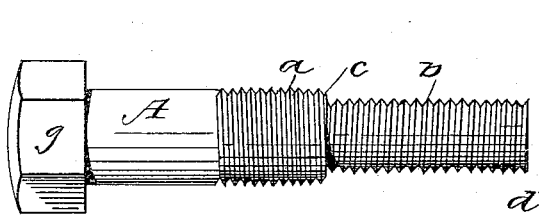
Figure 3:
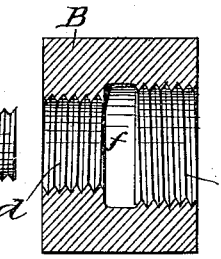
Figure 4:
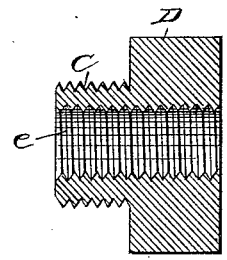

Figure 1 is a view of the bolt, showing the nuts properly located thereon and showing the female nut in section. Fig. 2 is a detached view of the bolt. Fig. 3 is a detached view of the female nut, showing the same in section. Fig. 4 is a detached view of the male nut, showing the same in section.

The present invention has relation to safety-bolts; and it consists in the different parts and combination of parts hereinafter described, and particularly pointed out in the claim.

Similar letters of reference indicate corresponding parts in all the figures of the drawings.

In the accompanying drawings, A represents the bolt, which may be of any desired size, reference being had to the use for which the bolt is to be used.

The bolt A is provided with the right and left hand screw-threads $a$ and $b$, which screw-threads are formed substantially as illustrated in the drawings. The body of the bolt, provided with the right-hand screw-thread $a$, is formed somewhat larger in diameter than the diameter of that portion of the bolt provided with the left-hand thread $b$, thereby forming the shoulder $c$. The female nut B is substantially of the form illustrated in the drawings, and, as shown, it is provided with the screw-threaded apertures $d$ and $d'$. The screw-threaded aperture $d$ is for the purpose of receiving the portion of the bolt A provided with the right-hand screw-thread $a$, and the screw-threaded aperture $d'$ being for the purpose of receiving the screw-threaded stem C of the male nut D, as illustrated in Fig. 1. The male nut D is provided with the screw-threaded aperture $e$, which is for the purpose of receiving the portion of the bolt A provided with the screw-thread $b$. It will be understood that the peripheries of the nuts B and D are to be formed angular for the purpose of applying a wrench. The female nut B is provided with the non-threaded space $f$, which non-threaded space is located between the screw-threaded apertures $d$ and $d'$. The non-threaded space $f$ is for the purpose of compensating for the difference in thickness of the device or devices designed to be clamped between the head $g$ and the female nut B and at the same bring the meeting faces of the nuts B and D together so as to bind or press against each other.

In use the bolt A is passed through the device or devices designed to be clamped and the female nut B turned onto said bolt in the ordinary manner, after which the male nut D is turned onto the bolt A and the stem C entered into the aperture $d'$, as illustrated in Fig. 1, after which the nuts are brought together by turning the nut D. It will be understood that after the nuts B and D are firmly seated together neither can rotate, as they are located upon portions of the bolt having differently-inclined threads, and thereby move upon the bolt A in opposite directions when rotated in the same direction. The nut B is securely locked or held against rotation until the stem C is entirely removed from the aperture $d'$ by reason of said stem having an oppositely-inclined thread from the screw-threaded portion $a$ of the bolt A.

It will be understood that my improved safety-bolt can be used to great advantage in machinery whereby the movements of the machinery are liable to loosen the nuts.

Having fully described my invention, what I claim as new, and desire to secure by Letters Patent, is—

The combination of the bolt A, provided with the right and left hand screw-threads $a$ and $b$, having different diameters, the female nut B, provided with the screw-threaded apertures $d$ and $d'$ with different diameters, and provided with the non-threaded space $f$ between the threaded apertures, the nut D, provided with the screw-threaded stem C, and the screw-threaded bolt-aperture $e$, all arranged substantially as shown, and for the purpose set forth.

In testimony that I claim the above I have hereunto subscribed my name in the presence of two witnesses.

ADAM C. GOODMAN.

Witnesses:
F. W. BOND,
LYDIA CAMPBELL.